(12) United States Patent
Habib et al.

(10) Patent No.: US 7,970,824 B1
(45) Date of Patent: Jun. 28, 2011

(54) CAPACITY PLANNING TOOL FOR THE WEB

(75) Inventors: Sami Habib, Safat (KW); Maytham H. Safar, Safat (KW)

(73) Assignee: Kuwait University, Safat (KW)

( * ) Notice: Subject to any disclaimer, the term of this patent is extended or adjusted under 35 U.S.C. 154(b) by 65 days.

(21) Appl. No.: 12/631,905

(22) Filed: Dec. 7, 2009

(51) Int. Cl.
*G06F 15/16* (2006.01)

(52) U.S. Cl. ........ 709/203; 709/201; 710/305; 710/105; 455/90.2

(58) Field of Classification Search .................. 709/203, 709/201; 710/305, 105; 455/90.2
See application file for complete search history.

(56) References Cited

U.S. PATENT DOCUMENTS

| | | | |
|---|---|---|---|
| 5,867,649 A * | 2/1999 | Larson | 709/201 |
| 5,883,640 A | 3/1999 | Hsieh | |
| 6,836,774 B2 | 12/2004 | Melbin | |
| 6,970,966 B2 * | 11/2005 | Gemelli et al. | 710/305 |
| 7,130,942 B2 * | 10/2006 | Gemelli et al. | 710/105 |
| 7,376,790 B2 | 5/2008 | Lango | |
| 7,383,389 B1 | 6/2008 | Bumbulis | |
| 2009/0215411 A1 * | 8/2009 | Tucker et al. | 455/90.2 |

* cited by examiner

*Primary Examiner* — Tammy T Nguyen
(74) *Attorney, Agent, or Firm* — Richard C. Litman

(57) ABSTRACT

The current invention is a Capacity Planning Tool for the Web. This tool is developed and integrated to be within an Internet browser tool. The tool is used as an XML markup language for describing multimedia presentations. It can be used to examine the capacity of the server and network to transmit the entire requested multimedia document smoothly without interruptions. Also, the system can be utilized as part of an interactive e-learning tool for Web page development.

18 Claims, 3 Drawing Sheets

CAPACITY PLANNING TOOL FOR THE WEB

BACKGROUND OF INVENTION

1. Field of Invention

The present invention relates to a concept of a capacity planning tool and in more particular one the works with an Internet browser tool.

2. Description of Prior Art

A multimedia document comprises of a mixture of heterogeneous objects, such as text, image, animation, audio, and video. Retrieving and rendering multimedia documents to the clients smoothly without interruptions require synchronization and scheduling among the objects that are involved with the multimedia document. Yet, the inordinate delays, which are encountered in retrieving all objects within a multimedia document, make it difficult to use the World Wide Web (WWW) for real-time applications such as distance learning, video conferencing/streaming, audio-on-demand and video-on-demand. Also, retrieving multimedia documents in time while placing the least workloads on the clients, servers, and networks resources is a challenging optimization problem.

PRIOR ART

U.S. Pat. No. 5,883,640 by Hsieh, et al. and issued on Mar. 16, 1999, is for various character strings that are repeatedly displayed on a graphics display. For example, strings such as "file", "edit", "view" and "help" are commonly displayed on nearly every screen. This redundancy of displayed character strings is exploited using a string cache and string caching method. A string cache stores a database of strings along with the rendered forms of the strings. The string cache stores the strings in a rendered form which for particular character strings and attributes and characteristics of the strings. The string cache is stored and accessed local to a graphics accelerator so that a single string request across a system bus activates the display of the entire string, including a display of the selected attributes and characteristics.

U.S. Pat. No. 6,836,774 by Melbin and issued on Dec. 28, 2004, is for a system for implementing a distributed electronic publishing environment with dynamic content. With this approach, the design of the page and content of the page remain separate, and yet automatic page generation may make use of caching techniques which are appropriate for the specific level of expected page content dynamics. The purpose of the page thus drives its caching implementation. If the page is relatively static, then the entire page itself is delivered from a static cache. If, however, only certain components of the page are expected to be dynamic, then only the portions of the page which can be rendered in advance are cached. The dynamic portions of the page are represented as executable versions of elements that specify instructions for how the page is to be rendered. Furthermore, result sets are cached when the dynamic portion of the page depends upon the contents of an external database. The architecture may also be implemented in an application server environment which supports execution on a server cluster.

U.S. Pat. No. 7,376,790 by Lango, et al. and issued on May 20, 2008, is for techniques for caching media data, including streaming media data, using content-sensitive identifiers. The content-sensitive identifiers enable a caching proxy or a caching server to unambiguously determine the version or contents of media data cached by the caching proxy for a particular data pointer or data reference (e.g., a URL) such that an appropriate version of the media data can be served to a requesting client system in an efficient and economical manner.

U.S. Pat. No. 7,383,389 by Bumbulis and issued on Jun. 3, 2008, is for a cache management system that provides improved page latching methodology is described. In one embodiment, for example, a method is described for providing access to data in a multi-threaded computing system, the method comprises steps of: providing a cache containing pages of data in memory of the multi-threaded computing system; associating a latch with each page in the cache to regulate access to the page, the latch allowing multiple threads to share access to the page for read operations and a single thread to obtain exclusive access to the page for write operations; in response to a request from a first thread to read a particular page, determining whether the particular page is in the cache without blocking access by other threads to pages in the cache; if the particular page is in the cache, attempting to obtain the latch for purposes of reading the particular page; and allowing the first thread to read the particular page unless a second thread has latched the particular page on an exclusive basis.

There is still room for improvement in the art.

SUMMARY OF INVENTION

The current invention is a Capacity Planning Tool for the Web to be developed and embedded within an Internet browser tool. The tool can be used as an XML markup language for describing multimedia presentations and how its objects (text, image, audio or video) mold together as a coherent Web document. It can be used to create online presentation similar to PowerPoint on desktop environment, or used as an interactive e-learning tool.

The system is more efficient, effective, accurate and functional than the current art.

DEFINITIONS

Browser: a software program that runs on a client host and is used to request Web pages and other data from server hosts. This data can be downloaded to the client's disk or displayed on the screen by the browser.

Client host: a computer that requests Web pages from server hosts, and generally communicates through a browser program.

Content provider: a person responsible for providing the information that makes up a collection of Web pages.

Embedded client software programs: software programs that comprise part of a Web site and that get downloaded into, and executed by, the browser.

Host: a computer that is connected to a network such as the Internet. Every host has a hostname (e.g., mypc.my company.com) and a numeric IP address (e.g., 123.104.35.12).

HTML (HyperText Markup Language): the language used to author Web Pages. In its raw form, HTML looks like normal text, interspersed with formatting commands. A browser's primary function is to read and render HTML.

HTTP (HyperText Transfer Protocol): protocol used between a browser and a Web server to exchange Web pages and other data over the Internet.

HyperText: text annotated with links to other Web pages (e.g., HTML).

IP (Internet Protocol): the communication protocol governing the Internet.

Server host: a computer on the Internet that hands out Web pages through a Web server program.

URL (Uniform Resource Locator): the address of a Web component or other data. The URL identifies the protocol used to communicate with the server host, the IP address of the server host, and the location of the requested data on the server host. For example, "http://www.lucent.com/ work.html" specifies an HTTP connection with the server host www.lucent.com, from which is requested the Web page (HTML file) work.html.

UWU server: in connection with the present invention, a special Web server in charge of distributing statistics describing Web traffic.

Visit: a series of requests to a fixed Web server by a single person (through a browser), occurring contiguously in time.

Web master: the (typically technically trained) person in charge of keeping a host server and Web server program running.

Web page: multimedia information on a Web site. A Web page is typically an HTML document comprising other Web components, such as images.

Web server: a software program running on a server host, for handing out Web pages.

Web site: a collection of Web pages residing on one or multiple server hosts and accessible through the same hostname (such as, for example, www.lucent.com).

BRIEF DESCRIPTION OF DRAWINGS

Without restricting the full scope of this invention, the preferred form of this invention is illustrated in the following drawings.

DETAILED DESCRIPTION

The following description is demonstrative in nature and is not intended to limit the scope of the invention or its application of uses.

There are a number of significant design features and improvements incorporated within the invention.

The computer application that includes the user interface for this invention will henceforth be referred to as "the System 1." The system is network-based and works on an Internet, Intranet, and/or Wireless network basis as well as a stand alone and fax-based system.

The system 1 is integrated and to be used within an Internet browser tool. The system 1 can be used as an XML markup language for describing multimedia presentations. It can be used to examine the capacity of the server and network to transmit the entire requested multimedia document smoothly without interruptions. Also, the system can be utilized as part of an interactive e-learning tool for Web page development. An HTML browser may use a System plug-in to display a system document embedded in an HTML/XML page.

Figure 1:
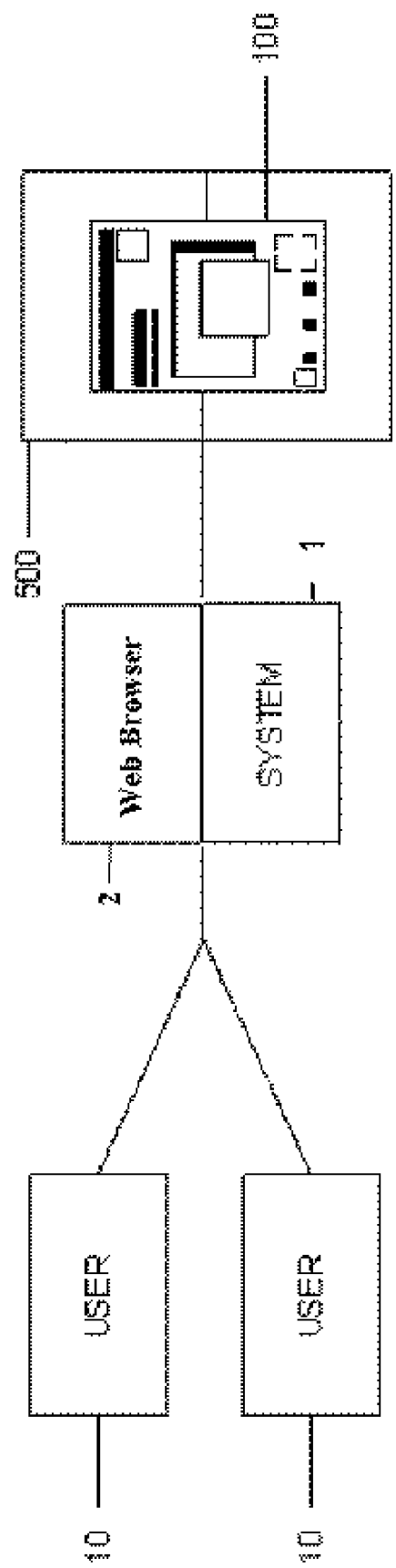
FIG. 1 shows an overview of how a User accessing the Internet using an Internet browser tool.

FIG. 1 illustrates a functional diagram of a computer network for World Wide Web 500 access to the System 1 from a plurality of Users 10 who accesses the system a Web Site 100 using their computer 35 using an Internet browser tool 2. Accessing the System Web Site 100 can be accomplished directly through a communication means such as a direct connection, an intranet, a local Internet Service Provider or Wireless devices.

Figure 2:
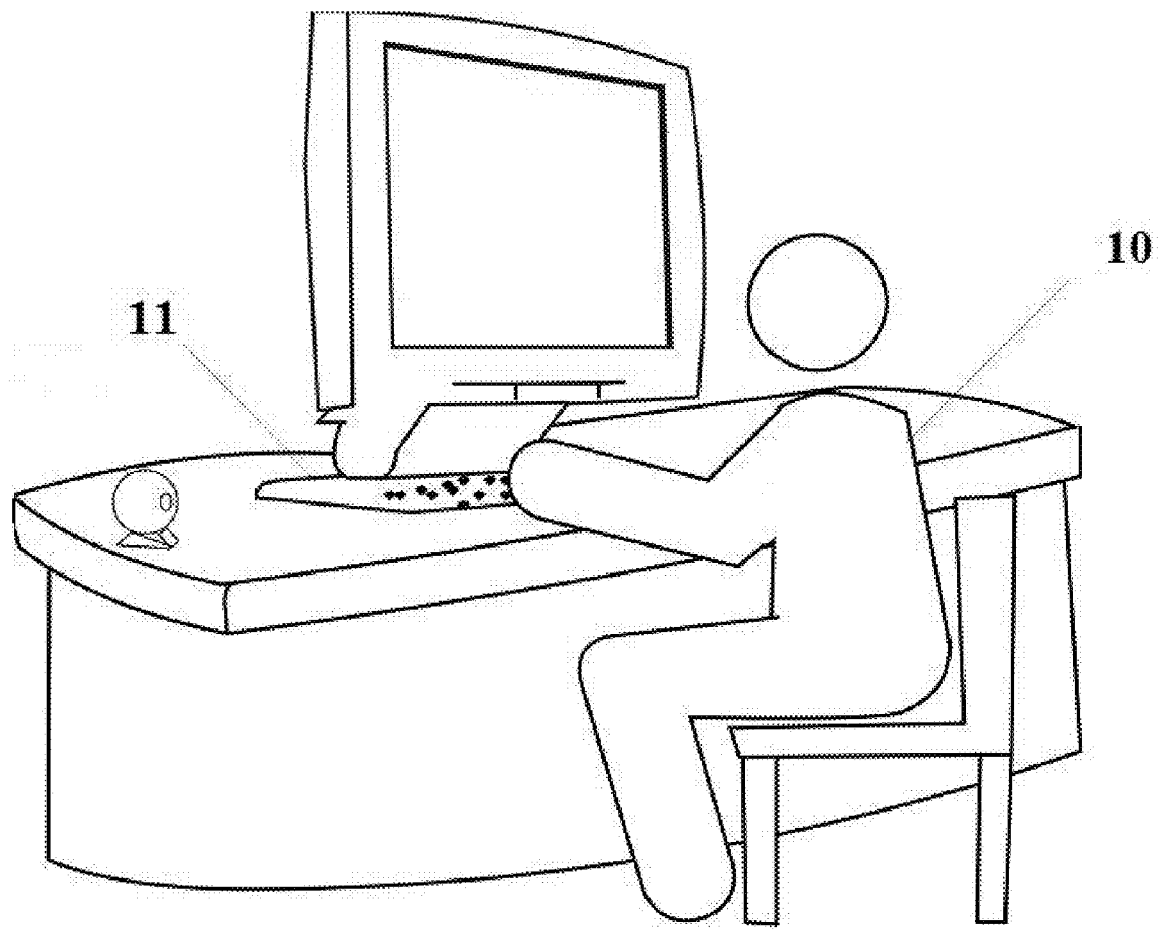
FIG. 2 shows a computer processing system that would use the system.

As shown in FIG. 2, the system 1 is set to run on a computing device 11. A computing device 11 on which the present invention can run would be comprised of a CPU, Hard Disk Drive, Keyboard, Monitor, CPU Main Memory, and a portion of main memory where the system resides and executes by changing the memory in the computing device and transferring electronic information to and from the computing device. A printer can also be included. Any general purpose computer with an appropriate amount of storage space is suitable for this purpose. The system can also be written in a number of different languages and run on a number of different operating systems and platforms.

The system 1 is designed as a formal model for synchronizing and scheduling a multimedia document using a client/server model. The system 1 formalizes the representation of a multimedia document into a four level hierarchy comprising of object, operation, time and precedence, where each successive level offers a fine-grain representation. The formal four-level representation of a multimedia document has provided a great support for synchronization and scheduling, where now clients can examine and retrieve a multimedia document keeping in mind the current status workloads on the servers and networks. The system 1 uses coded software that will automatically perform all translations between the four levels representation, synchronize the rendering of all objects and provide a schedule for fetching all objects from the server, transmitting all object from the server to the client through the network, and processing and rendering all objects at the client's computer.

Figure 3:
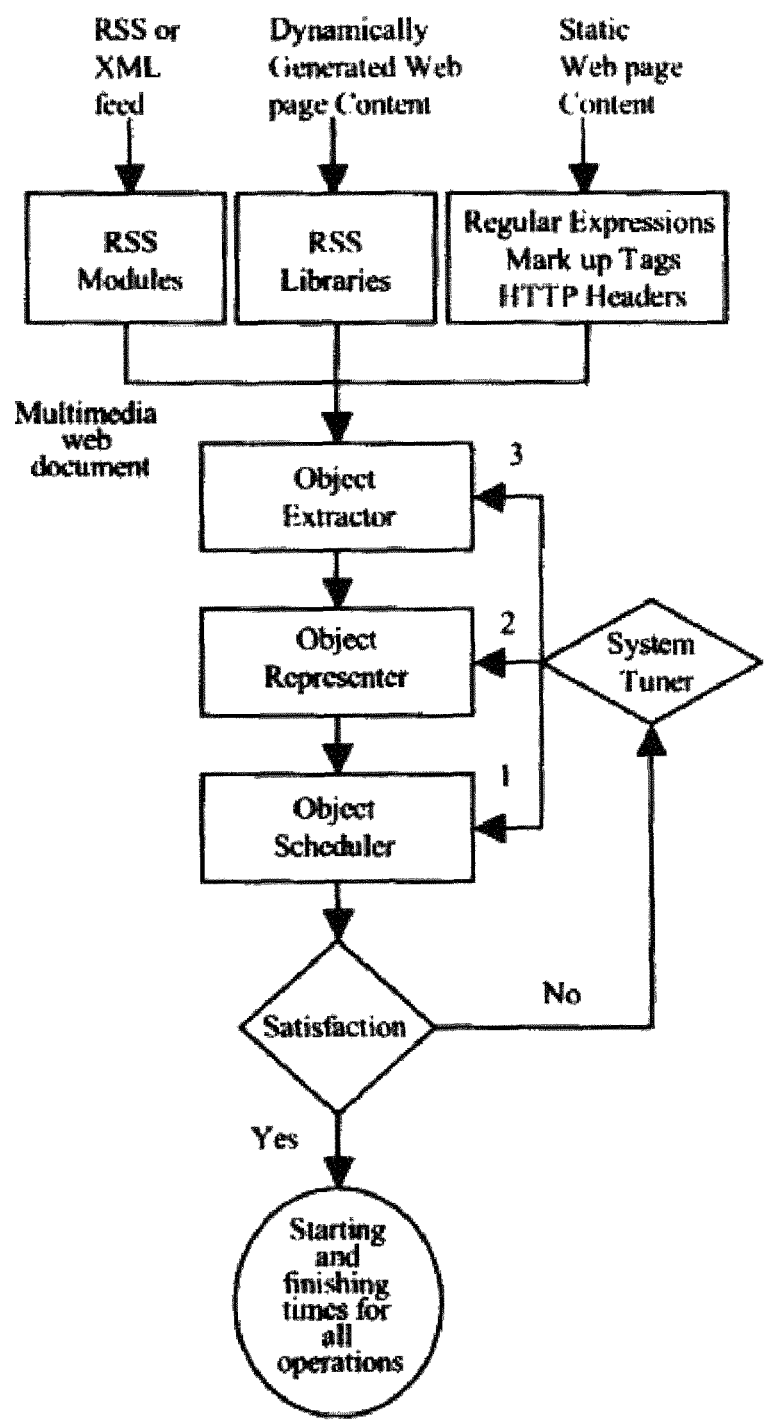
FIG. 3 displays the system software tool overview.

The system software tool overview is shown in the FIG. 3. The system 1 performs the following tasks. First, it models the extracted objects into an object flow graph (OFG). Second, it transforms the OFG into an operation flow graph (OPFG). Third, it transforms the OFG into a precedence flow graph (TFG). Fourth, it transforms the TFG into a precedence flow graph (PFG). Finally, it finds a feasible schedule to all operations within PFG. The 4-level hierarchy model (object, operation, timing and precedence), offers a fine-grain representation of multimedia contents. The system 1 utilizes the 4-level hierarchy to synchronize the retrieval of objects in the multimedia document employing Allen's temporal relations, and then applies the Bellman-Ford's algorithm (or any similar algorithms for finding the shortest path in a graph) on the precedence graph to schedule all operations (fetch, transmit, process, and render) while satisfying the in-time updating and all web workload's resources constraints.

The current invention does not measure the overhead cost in gathering the network load and traffic analysis required to retrieve the document on time. The System 1 should be enhanced to automatically measure and/or approximate the available bandwidth of the system using sophisticated measurement of end-to-end connectivity. In addition, the System 1 can be expanded and enhanced to examine system infrastructure for more real-time applications, such as tele-medicine and e-learning.

ADVANTAGES

No prior tool was considered to be embedded within an Internet browser to utilize the dynamic Web's objects scheduling or retrieval with restrictions. It performs a dynamic scheduling of multimedia documents with frequent updates taking into consideration the network's workload and can be used to guild the distributed systems designer/manager to schedule or tune her/his resources or optimal or near optimal performance, subject to minimizing the cost of document retrieval while satisfying the in time constraints.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A Capacity Planning Tool comprising:
having a system run on a computing device in its memory for synchronizing and scheduling a multimedia document using a client/server model where said system is incorporated with an Internet browser tool having said system formalizes the representation of a multimedia document into hierarchy structure where said hierarchy structure being comprised of a four level hierarchy comprising of object, operation, time and precedence, where each successive level offers a fine-grain representation, where the system looks up the current status workloads on the servers and networks, where the system uses coded software to automatically perform translations between the levels representation, where the system uses coded software the will automatically perform all translations between the four levels representation, synchronizes the rendering of all objects and provides a schedule for fetching all objects from the server, transmitting all object from the server to the client through the network, and processing and rendering all objects at the client's computer, wherein the system performs the following tasks, models the extracted objects into an object flow graph (OFG), transforms the OFG into an operation flow graph (OPFG), transforms the OFG into a precedence flow graph (TFG), transforms the TFG into a precedence flow graph (PFG).

2. The Capacity Planning Tool as described in claim 1, further comprising having said system formalizes the representation of a multimedia document into hierarchy structure.

3. The Capacity Planning Tool as described in claim 2, further comprising having said hierarchy structure being comprised of a four level hierarchy comprising of object, operation, time and precedence, where each successive level offers a fine-grain representation.

4. The Capacity Planning Tool as described in claim 1, where the system looks up the current status workloads on the servers and networks.

5. The Capacity Planning Tool as described in claim 3, where the system uses coded software to automatically perform translations between the levels representation.

6. The Capacity Planning Tool as described in claim 3, where the system uses coded software the will automatically perform all translations between the four levels representation, synchronizes the rendering of all objects and provides a schedule for fetching all objects from the server, transmitting all object from the server to the client through the network, and processing and rendering all objects at the client's computer.

7. The Capacity Planning Tool as described in claim 3, where the system finds a feasible schedule to all operations within PFG.

8. The Capacity Planning Tool as described in claim 3, where the system utilizes the 4-level hierarchy to synchronize the retrieval of objects in the multimedia document employing Allen's temporal relations.

9. The Capacity Planning Tool as described in claim 3, where the system applies the Bellman-Ford's algorithm to schedule all operations (fetch, transmit, process, and render) while satisfying the in-time updating and all web workload's resources constraints.

10. The Capacity Planning Tool as described in claim 1, where the System examines system infrastructure for more real-time applications.

11. The Capacity Planning Tool as described in claim 10, where the System said real-time applications is tele-medicine.

12. The Capacity Planning Tool as described in claim 10, where the System said real-time applications is e-learning.

13. A Capacity Planning Tool comprising:
having a system run on a computing device in its memory for synchronizing and scheduling a multimedia document using a client/server model where said system is incorporated with an Internet browser tool having said system formalizes the representation of a multimedia document into hierarchy structure where said hierarchy structure being comprised of a four level hierarchy comprising of object, operation, time and precedence, where each successive level offers a fine-grain representation, where the system looks up the current status workloads on the servers and networks, where the system uses coded software to automatically perform translations between the levels representation, where the system uses coded software the will automatically perform all translations between the four levels representation, synchronizes the rendering of all objects and provides a schedule for fetching all objects from the server, transmitting all object from the server to the client through the network, and processing and rendering all objects at the client's computer, wherein the system performs the following tasks, models the extracted objects into an object flow graph (OFG), transforms the OFG into an operation flow graph (OPFG), transforms the OFG into a precedence flow graph (TFG), transforms the TFG into a precedence flow graph (PFG).

14. The Capacity Planning Tool as described in claim 13, where the system finds a feasible schedule to all operations within PFG.

15. The Capacity Planning Tool as described in claim 13, where the system utilizes the 4-level hierarchy to synchronize the retrieval of objects in the multimedia document employing Allen's temporal relations and where the system applies the Bellman-Ford's algorithm to schedule all operations (fetch, transmit, process, and render) while satisfying the in-time updating and all web workload's resources constraints.

16. The Capacity Planning Tool as described in claim 13, where the System examines system infrastructure for more real-time applications.

17. The Capacity Planning Tool as described in claim 16, where the System said real-time applications is tele-medicine.

18. The Capacity Planning Tool as described in claim 16, where the System said real-time applications is e-learning.

* * * * *